(12) United States Patent
Blanchard

(10) Patent No.: US 8,764,883 B2
(45) Date of Patent: Jul. 1, 2014

(54) APPARATUS AND METHODS FOR SATURATING AND PURIFYING SYNGAS

(75) Inventor: Kenneth L. Blanchard, Houston, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 200 days.

(21) Appl. No.: 13/267,185

(22) Filed: Oct. 6, 2011

(65) Prior Publication Data
US 2013/0087742 A1    Apr. 11, 2013

(51) Int. Cl.
| | | |
|---|---|---|
| *C01B 3/52* | (2006.01) | |
| *B01D 47/14* | (2006.01) | |
| *C10K 1/10* | (2006.01) | |
| *C10K 3/04* | (2006.01) | |
| *C10K 1/00* | (2006.01) | |
| *B01D 53/14* | (2006.01) | |
| *C10K 1/02* | (2006.01) | |

(52) U.S. Cl.
CPC ........... *B01D 47/14* (2013.01); *C01B 2203/048* (2013.01); *B01D 2257/406* (2013.01); *B01D 2252/103* (2013.01); *C10K 1/101* (2013.01); *C01B 3/52* (2013.01); *C01B 2203/0465* (2013.01); *C10J 2300/093* (2013.01); *C10K 3/04* (2013.01); *C10K 1/002* (2013.01); *C10K 1/004* (2013.01); *C10K 1/024* (2013.01); *B01D 2257/30* (2013.01); *B01D 53/1406* (2013.01); *C01B 2203/0485* (2013.01); *B01D 2257/20* (2013.01); *B01D 53/1487* (2013.01)
USPC ................... 95/156; 95/199; 95/211; 95/223; 95/232; 95/233; 95/237

(58) Field of Classification Search
USPC ............................................... 96/290; 95/149
See application file for complete search history.

(56) References Cited

U.S. PATENT DOCUMENTS

| | | | |
|---|---|---|---|
| 1,732,086 A | 10/1929 | Flippen | |
| 3,791,102 A | 2/1974 | Huntington | |
| 4,035,166 A * | 7/1977 | Van Hecke | ....................... 95/163 |
| 6,077,490 A | 6/2000 | McIlroy et al. | |
| 6,232,352 B1 * | 5/2001 | Vidalin | ......................... 518/700 |
| 6,623,537 B1 | 9/2003 | Jahnke | |
| 6,964,696 B2 | 11/2005 | Malatak et al. | |
| 7,056,487 B2 | 6/2006 | Newby | |
| 7,927,513 B1 | 4/2011 | Hickey | |
| 2008/0210089 A1 * | 9/2008 | Tsangaris et al. | .................. 95/90 |
| 2011/0024282 A1 * | 2/2011 | Meintjes et al. | ................. 203/40 |
| 2011/0210292 A1 * | 9/2011 | Ariyapadi et al. | ............ 252/373 |
| 2011/0232494 A1 | 9/2011 | Dugan et al. | |
| 2012/0060689 A1 * | 3/2012 | Naumovitz et al. | .............. 95/165 |

OTHER PUBLICATIONS

Definition of Essentially PDF.*
Solubility of gases in water; engineering toolbox, May 7, 2014.*

* cited by examiner

*Primary Examiner* — Duane Smith
*Assistant Examiner* — Cabrena Holecek
(74) *Attorney, Agent, or Firm* — Gary M. Machetta

(57) ABSTRACT

Apparatus and processes for saturating and purifying syngas are provided. In one or more embodiments, the apparatus can include two packed beds through which water and syngas flow countercurrently. In the first bed, the syngas can be at least partially saturated with water, and in the second bed hydrocarbons, byproducts, or both can be removed from the syngas. Processes for saturating and purifying syngas using the apparatus discussed and described herein are also provided.

14 Claims, 1 Drawing Sheet

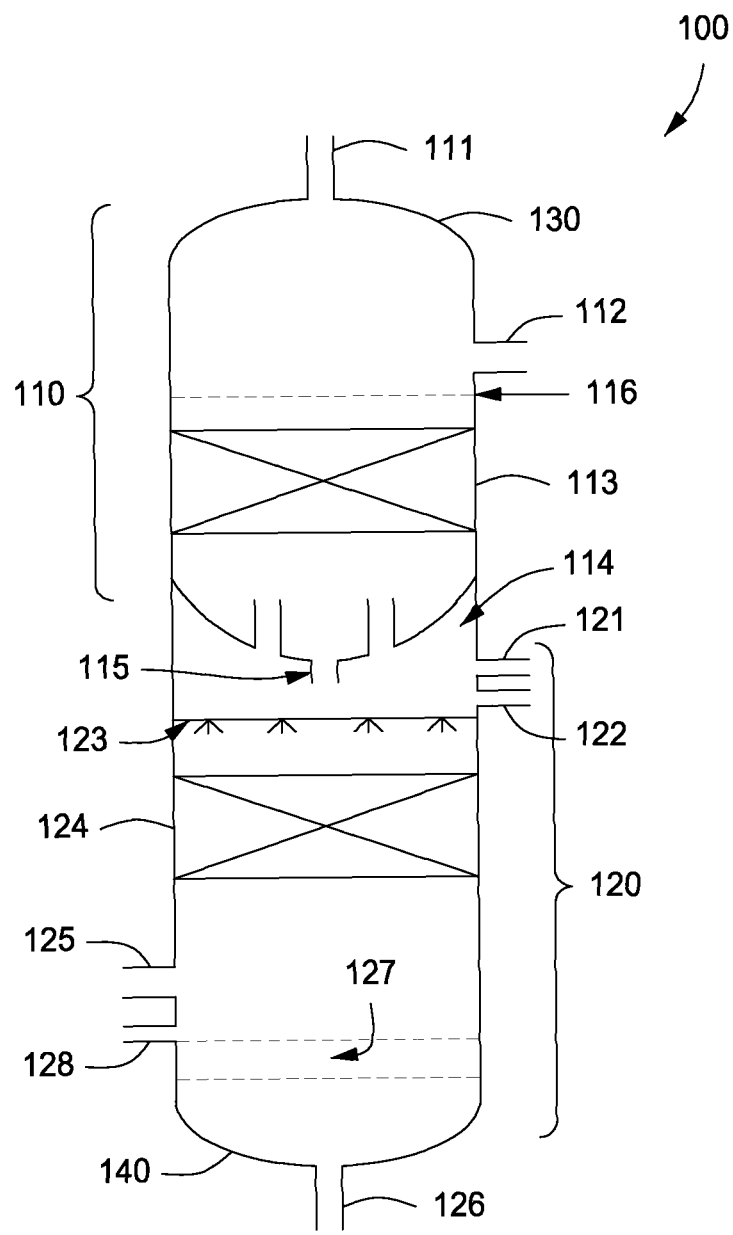

APPARATUS AND METHODS FOR SATURATING AND PURIFYING SYNGAS

BACKGROUND

1. Field

Embodiments described herein generally relate to apparatus and processes for at least partially saturating and purifying syngas.

2. Description of the Related Art

Coal gasification is a high-temperature process usually conducted at elevated pressure to convert carbon-containing materials into carbon monoxide and hydrogen gas, commonly called "syngas." The coal gasification process creates slag and ash in addition to the syngas. Additionally, the syngas can include byproducts such as tar and other hydrocarbons, ammonia, halides, and sulfur-containing compounds. Syngas can be further treated to produce a variety of desirable intermediate and end use products. For example, syngas can be reacted in a Fischer-Tropsch reactor to provide alkanes, or syngas can be reacted in a water-gas shift reactor to produce additional hydrogen. It is desirable, however, to remove ash and other particulates as well as any undesirable byproducts from the syngas before such downstream processes.

Gasification processes typically use one of two methods to remove slag and ash downstream from the gasifier. In a first process, slag and ash are removed as part of a water quench step. In a second process, slag and ash are removed from the hot gas stream exiting the gasifier by mechanical filtration and the syngas is later cooled in a separate step. While this second process removes a substantial amount of ash and particulate materials, small quantities still remain in the syngas, along with byproducts such as heavy and light hydrocarbons ($C_2$-$C_{20+}$), ammonia-containing compounds, sulfur-containing compounds, and halides.

There is a need, therefore, for improved apparatus and processes for removing ash and/or byproducts from syngas, while also at least partially saturating the syngas so that it may be used in downstream processes.

BRIEF DESCRIPTION OF THE DRAWING

The FIGURE depicts a cross-sectional side elevation view of an illustrative apparatus for at least partially saturating and purifying syngas, according to one or more embodiments described.

DETAILED DESCRIPTION

Apparatus and processes for the purification of syngas are provided. The apparatus can include a first packed bed and a second packed bed, where the first bed is located closer to a first end of the apparatus than the second bed. The apparatus can also include a first water inlet for introducing water to the apparatus and a syngas outlet for withdrawing a syngas product from the apparatus, both located at the first end or between the first end and the first bed. The apparatus can also include a first water outlet for withdrawing water from the apparatus and a second water inlet for introducing water to the apparatus, both located between the first bed and the second bed. The apparatus can also include a syngas inlet for introducing a syngas to the apparatus and a second water outlet for withdrawing water from the apparatus, both located at a second end of the apparatus or between the second bed and the second end. The first bed can include a packing material suitable to facilitate at least partial saturation of the syngas with water and the second bed can include a packing material suitable to facilitate extraction of byproducts from the syngas to produce the syngas product. The packing materials used in each bed may be the same or different, and may be structured or random packing materials.

The apparatus and processes discussed and described herein can remove residual particulates and/or byproducts while at least partially saturating syngas, all in the same piece of equipment. For example, the apparatus can use water in an upper circulating loop with a first packed bed to at least partially saturate syngas and, if desired, heat the syngas to a temperature suitable for downstream processing. The apparatus can also include a second packed bed, situated generally lower in the apparatus, which can be supplied with water from an upper section of the apparatus. The second packed bed can condense and wash out trace components in the syngas. As such, the apparatus can be used as a multifunctional scrubbing device, which serves to at least partially saturate syngas, remove fine particles, remove contaminants, heavy hydrocarbons, and/or other byproducts such as halides, sulfur-containing compounds, and/or ammonia-containing compounds. Further, the apparatus can perform these functions at a lower cost compared to conventional high-temperature scrubbers. The syngas can be cooled prior to entering the apparatus, which can reduce the metallurgy requirements of the apparatus. Additionally, because the majority of solid particles such as slag and ash can be filtered out of the syngas before entering the apparatus, generation of black water can be reduced and/or eliminated and overall make up water requirements can be significantly reduced.

The apparatus can be referred to or described as a scrubbing apparatus or a scrubber. Although the terms "scrubbing" and "scrubber" are used throughout this description, the design and function of the apparatus discussed and described herein are not necessarily limited to the conventionally known and understood uses of these terms in the art. Instead, these terms are merely used for the sake of convenience and any device, apparatus, and/or process having a configuration or function that falls within the embodiments discussed and described herein and/or the appended claims shall be considered to fall within the scope of the invention. The apparatus can include two packed beds through which water and syngas flow in a generally countercurrent fashion. In the first bed, syngas can be at least partially saturated with water and in the second bed particulates, hydrocarbons, and/or other byproducts can be removed from the syngas.

The apparatus can be substantially vertical in orientation, with the first end at the top of the apparatus and the second end at the bottom of the apparatus. In this or other embodiments, the flow of syngas and water through the apparatus can be generally countercurrent in nature, such that the syngas enters at the bottom, or second, end and exits the top, or first, end while the water enters at the top, or first, end and flows toward the bottom, or second, end of the apparatus.

The process for at least partially saturating and purifying syngas can include providing or introducing water via a first water inlet to the first end of an apparatus and providing or introducing a syngas via a syngas inlet to the second end of the apparatus such that the water and syngas flow generally countercurrently through the apparatus. A first packed bed and a second packed bed can be provided within the apparatus. Water and syngas can be allowed to flow through the first bed under conditions sufficient to at least partially saturate the syngas. Water and syngas can be allowed to flow through the second bed under conditions sufficient to at least partially remove byproducts from the syngas. The process can also include withdrawing water from the apparatus via a second water outlet at the second end of the apparatus and withdrawing syngas from the apparatus via a syngas outlet at the first end of the apparatus.

The first bed can be located closer to the first end of the apparatus than the second bed, and water can be withdrawn from the apparatus via a first water outlet located between the first bed and the second bed, at which point the water can be collected, directed elsewhere in the syngas manufacturing process, or recycled. For example, at least a portion of the water removed from the process at the first water outlet can be recycled to and re-enter the apparatus at the first water inlet. In another example, water can be provided to the apparatus via a second water inlet located between the first bed and the second bed. The water provided to the second water inlet can include fresh or make up water, water recycled from another apparatus or location in the syngas manufacturing process, water withdrawn from the apparatus via the first water outlet, or any combination thereof.

The apparatus and processes discussed and described herein can serve to both at least partially saturate syngas with water and at least partially remove particulates, hydrocarbons, and/or other byproducts from the syngas. Typically, the syngas provided to the apparatus can include, but is not limited to, methane, carbon monoxide, carbon dioxide, hydrogen, water, nitrogen, or any combination thereof. For example, the syngas can include from about 1 wt % to about 10 wt % methane, from about 10 wt % to about 30 wt % carbon monoxide, from about 10 wt % to about 30 wt % carbon dioxide, from about 0 wt % to about 2 wt % hydrogen, from about 3 wt % to about 10 wt % water, and from about 40 wt % to about 70 wt % nitrogen. The syngas can also include, but is not limited to, one or more particulates such as slag, soot, or ash, $C_2$-$C_{20+}$ hydrocarbon compounds, and/or other byproducts of the syngas manufacturing process, particularly the production of syngas by gasifying coal. Other byproducts can include, but are not limited to, halides, ammonia-containing compounds, sulfur-containing compounds, or any combination thereof. These are typically trace components that can be present in the syngas provided to the apparatus in amounts less than about 2 wt % each.

The syngas provided to the scrubbing apparatus can be obtained or produced by gasifying coal. Coal gasification devices and processes are well known in the art, and any such known gasification method is considered to be appropriate for producing syngas. In some embodiments, the syngas produced by gasifying coal can be cooled, filtered, or both prior to entering the scrubbing apparatus. These cooling and filtering operations can be performed in the same or separate units, and such cooling and filtering devices are also known in the art. Additionally, once at least partially saturated and purified as described herein, the resulting syngas can be further treated in one or more downstream processes to produce a variety of desirable intermediate and end use products. For example, the syngas can be reacted in a Fischer-Tropsch reactor to produce alkanes and/or the syngas can be reacted in a water-gas shift (WGS) reactor to increase the hydrogen yield. In at least one example, an at least partially saturated and purified syngas exiting the scrubbing apparatus discussed and described herein can be further treated in a WGS reactor.

In one or more embodiments, a process for the treatment of syngas is provided. The process can include, but is not limited to, filtering syngas produced by the gasification of coal to at least partially remove ash, other particulate materials, or combinations from the syngas and cooling the syngas. The process can further include at least partially saturating and purifying the cooled and filtered syngas by treating it using the scrubbing apparatus discussed and described in further detail herein and, optionally, supplying the at least partially saturated and purified syngas to a water gas shift reactor.

The FIGURE depicts a cross-sectional side elevation view of an illustrative apparatus 100 for at least partially saturating and purifying syngas, according to one or more embodiments. The apparatus 100 can be provided in the form of a vessel with an elongated shell having first and second ends, 130 and 140, respectively. The apparatus 100 can be oriented at any desired angle. For example, the apparatus 100 can be substantially vertical in orientation, such that the first end 130 is at the top of the apparatus 100 and the second end 140 is at the bottom of the apparatus 100. The apparatus 100 can also be divided generally into a top, or first, section and a bottom, or second, section, 110 and 120, respectively.

The apparatus 100 can include a first packed bed 113, located nearer the first or top end 130 and generally within the top section 110, and a second packed bed 124, located nearer the second or bottom end 140 and generally within the bottom section 120. Each of the packed beds 113, 124 can have the same or different depth and construction, and the beds can contain the same or different packing material. The packing material in the first and second beds 113 and 124 may be the same or different. In some embodiments, the packing materials will be different, as the first and second beds 113 and 124 can be intended for different purposes. For example, the first packed bed 113 can be intended to facilitate the saturation of syngas with water. Accordingly, any packing material suitable for this intended purpose can be used. In another example, the second packed bed 124 can be intended to facilitate removal of hydrocarbons, particulates, and other byproducts from the syngas. Accordingly, any packing material suitable for the intended purpose of the second bed can be used.

In one or more embodiments, the packing material in the first bed 113 can be a random packing material. Random packing materials can be composed of a variety of materials including, but not limited to, metal and metal alloys, plastic, ceramics, or any combination thereof. Representative random packing materials can include, but are not limited to, Raschig rings, Pall rings, Lessig rings, splined rings, Berl saddles, Intalox saddles, and the like. In one example, the packing material can be IMTP #70 high performance random packing, available commercially from Koch-Glitsch LP.

In one or more embodiments, when the first bed 113 includes randomly packed material(s), the bed can further include a bed support at the bottom of the bed (not shown) upon which the packing material rests and/or a bed limiter, or hold-down, (also not shown) set above the bed to prevent the pieces of packing from migrating or entraining upward. The bed support can be, for example, a gas injection support plate or grid having a minimum open area of about 85%, about 90%, or about 95%. The bed limiter can be, for example, a plate or grid having a minimum open area of about 70%, or about 75%, or about 80%. Generally, the bed limiter does not rest on top of the packing material, but rather is supported by the inner wall of the apparatus 100.

In one or more embodiments, the packing material in the second bed 124 can be a structured packing material. Structured packing material can be made from metal, which may be smooth or textured and perforated or solid, that is folded or otherwise arranged with a regular geometry to give a high surface area with a high void fraction. Structured packing material is produced by a number of manufacturers, and the design of the packing is typically proprietary in nature. The construction of the various proprietary types is generally similar, while performance varies depending upon size. Any packing known by those of skill in the art to be suitable for vessels and purposes such as those described herein can be used. Structured packing manufacturers from whom such packing can be obtained include, but are not limited to, Sulzer Chemtech Ltd., Koch-Glitsch LP, Raschig GmbH, Jaeger Products Inc., and GTC Technology. In one example, the packing employed is Flexipac 2×, available commercially from Koch-Glitsch LP.

When the second bed 124 contains a structured packing, the bed can further include a bed support at the bottom of the bed (not shown) upon which the packing material rests and a bed limiter (also not shown) set above the bed to prevent the packing from migrating upward. The bed support can be, for example, a structured packing bed support plate or grid. The bed limiter can be, for example, a non-interfering structured packing bed limiter supported by the inner wall of the apparatus 100 rather than resting upon the packing material.

Water can be introduced to the apparatus 100 via the first water inlet 112, located generally in the top section 110 between the first packed bed 113 and the first end 130. The first water inlet 112 can be a single inlet, or can include two or more individual inlets, each of which can supply water to the apparatus 100. For example, the first water inlet 112 can include separate inlets for fresh or make up water, recycled water, and/or pump-around water (not shown). Similarly, the water supplied to the apparatus via the first water inlet 112 can include solely fresh water, or can include a combination of recycled water, pump-around water, and/or fresh (or make up) water. The water entering the apparatus 100 via the first water inlet 112 flows generally downward (i.e., from the first end 130 toward the second end 140) into and through the first packed bed 113. Optionally, the apparatus 100 can include a liquid distributor 116 positioned between the first water inlet 112 and the first packed bed 113 to ensure even flow and distribution of water through the bed.

The top section 110 and the bottom section 120 of the apparatus 100 can be, at least partially, physically separated by divider 114. The divider 114 can be, for example, a chimney pan or similar device. The divider 114 can allow for the collection and removal of water from the top section 110 of the apparatus 100 while permitting syngas to flow upward through the apparatus 100 (from the second end 140 toward the first end 130) with minimal impediment. The water collecting in the divider 114 can be withdrawn through an outlet 115 in the pan and removed from the apparatus 100 via a first water outlet 121 using a pump (not shown) or similar method suitable for removing the water from the apparatus 100. In such embodiments, it will be appreciated that outlets 121 and 115 can be connected (not shown) to facilitate the removal of the water.

The water removed via the first water outlet 121 can be disposed of, recycled, filtered, heated or cooled, or otherwise treated upon exiting the apparatus 100. In one example, at least a portion of the water exiting the apparatus 100 by way of the first water outlet 121 can be recycled via a recycle line (not shown) and returned to the apparatus 100 via first water inlet 112. Optionally, the recycled water can first be heated or cooled, depending upon process requirements, before being returned to the apparatus 100. In the same or other example, a portion of the water removed at first water outlet 121 can also be introduced to the bottom section 120 of the apparatus 100 via a second water inlet 122. If necessary, additional fresh or make up water can also be introduced via the second water inlet 122 in addition to the water recycled and supplied from the first water outlet 121. The second water inlet 122 can be a single inlet, or can include two or more individual inlets, each of which supplies water to the bottom section 120 of the apparatus 100. For example, the second water inlet 122 can include separate inlets for fresh or make up water, recycled water, and/or pump-around water (not shown). The second water inlet 122 is located in the bottom section 120 of the apparatus 100 generally above the second packed bed 124 and below the divider 114.

The water entering the bottom section 120 of the apparatus 100 via the second water inlet 122 can flow generally downward through the apparatus 100 into and through the second packed bed 124. Optionally, the apparatus 100 can include a liquid distributor such as a spray distributor 123 positioned at or near the second water inlet 122 (and above the second packed bed 124) to ensure even flow of water through the second bed.

Water exiting the second packed bed 124 can be removed from the apparatus via the second water outlet 126, located at or near the second end 140 of the apparatus 100. Optionally, in one or more embodiments the water can be allowed to collect at the second end 140 of the apparatus 100 in a collection zone 127 before being withdrawn through the second water outlet 126. In such embodiments, the water can be held in the apparatus 100 for an amount of time sufficient to allow light hydrocarbons mixed in with the water to float to the surface of the collected water. These light hydrocarbons can then be skimmed or otherwise removed from the surface or upper portion of the collected water via hydrocarbon outlet 128, and the water removed via second water outlet 126.

Syngas can be introduced to the apparatus 100 via the syngas inlet 125, located generally in the bottom section 120 of the apparatus 100 between the second end 140 and the second packed bed 124. If light hydrocarbons are collected from the apparatus 100 using the method described in the preceding paragraph, the syngas inlet can be positioned above the hydrocarbon outlet 128 but below the second packed bed 124. The syngas entering the apparatus via the syngas inlet 125 can flow generally upward (i.e., from the second end 140 toward the first end 130) into and through the second packed bed 124, where hydrocarbons, particulates, and other byproducts of the syngas manufacturing process such as ammonia-containing compounds, sulfur-containing compounds, and halides can be at least partially removed.

Upon exiting the second packed bed 124, the at least partially purified syngas can continue to flow upward through the bottom section 120, through the divider 114, and into and through the first packed bed 113. In the first packed bed 113, the syngas can be at least partially saturated with water. The syngas can also be heated (or cooled depending upon downstream requirements) by the water within the first packed bed 113. The at least partially purified and at least partially saturated syngas can exit the first packed bed 113 and be removed from the apparatus 100 as a syngas product via syngas outlet 111.

In some embodiments, an optional demisting pad (not shown) can be positioned above the first water inlet 112 and below the syngas outlet 111 to remove residual water droplets entrained in the syngas. The demisting pad can be a single pad having a single density, or can be a single pad or multiple pads having multiple densities. In one embodiment, the demisting pad can be a dual density pad wherein the density of the upper portion of the pad is greater than the density of the lower portion of the pad. When employed, the demisting pad or pads can be held in place within the apparatus 100 by one or more support grids.

In certain embodiments, depending, at least in part, on the conditions upstream of the apparatus 100 and/or requirements for downstream operations, it can be desirable to heat or cool the syngas as it passes through the apparatus 100 by manipulating the water temperature and/or pressure conditions within the apparatus 100 accordingly. In certain embodiments, the water can heat the syngas as it passes through the apparatus 100 such that the temperature of the syngas at the syngas outlet 111 is greater than the temperature of the syngas at the syngas inlet 125. For example, the syngas temperature at the outlet 111 can be at least about 10° F., or at least about 15° F., or at least about 20° F., or at least about 25° F. greater than the syngas temperature at the inlet.

Embodiments discussed and described herein further relate to any one or more of the following paragraphs:

1. An apparatus for the purification of syngas, comprising: a first packed bed and a second packed bed, wherein the first bed is located closer to a first end of the apparatus than the second bed; a first water inlet for introducing water to the apparatus and a syngas outlet for withdrawing a syngas product from the apparatus, both located at the first end or between the first end and the first bed; a first water outlet for withdrawing water from the apparatus and a second water inlet for introducing water to the apparatus, both located between the first bed and the second bed; and a syngas inlet for introducing a syngas to the apparatus and a second water outlet for withdrawing water from the apparatus, both located at a second end of the apparatus or between the second bed and the second end, wherein the first bed comprises a packing material suitable to facilitate at least partial saturation of the syngas with water and the second bed comprises a packing material suitable to facilitate extraction of byproducts from the syngas to produce the syngas product.

2. The apparatus according to paragraph 1, wherein the flow of water and syngas through the apparatus is countercurrent.

3. The apparatus according to paragraph 1 or 2, wherein a temperature of the syngas at the syngas outlet is greater than the temperature of the syngas at the syngas inlet.

4. The apparatus according to any one of paragraphs 1 to 3, wherein the apparatus has a generally vertical orientation, and wherein the first end is at the top of the apparatus and the second end is at the bottom of the apparatus.

5. The apparatus according to any one of paragraphs 1 to 4, further comprising a top section and a bottom section, wherein the first packed bed is located in the top section and the second packed bed is located in the bottom section, and wherein the top and bottom sections are separated by a full or partial physical divider.

6. The apparatus according to paragraph 5, wherein the physical divider is a chimney pan.

7. The apparatus according to any one of paragraphs 1 to 6, wherein the byproducts extracted from the syngas are selected from the group consisting of particulate materials, $C_2$-$C_{20}$ hydrocarbons, halides, sulfur-containing compounds, ammonia-containing compounds, and combinations thereof.

8. The apparatus according to any one of paragraphs 1 to 7, further comprising a hydrocarbon outlet for withdrawing light hydrocarbons from the apparatus located generally between the second catalyst bed and the second end.

9. The apparatus according to any one of paragraphs 1 to 8, further comprising a recycle line for recycling at least a portion of the water withdrawn at the first water outlet to the first water inlet.

10. The apparatus according to any one of paragraphs 1 to 9, wherein the first bed comprises a random packing material and the second bed comprises a structured packing material.

11. A process for at least partially saturating and purifying syngas comprising: introducing water via a first water inlet to the first end of an apparatus having a first end and a second end and introducing a syngas via a syngas inlet to the second end of the apparatus such that the water and syngas flow generally countercurrently through the apparatus; providing a first packed bed and a second packed bed within the apparatus, wherein the first bed is located closer to the first end of the apparatus than the second bed; flowing water and syngas through the first bed under conditions sufficient to at least partially saturate the syngas; withdrawing water from the apparatus via a first water outlet located between the first bed and the second bed; introducing water to the apparatus via a second water inlet located between the first bed and the second bed; flowing water and syngas through the second bed under conditions sufficient to at least partially remove byproducts from the syngas; withdrawing water from the apparatus via a second water outlet at the second end of the apparatus; and withdrawing a syngas product from the apparatus via a syngas outlet at the first end of the apparatus.

12. The process according to paragraph 11, wherein the first bed comprises a packing material suitable to facilitate the at least partial saturation of the syngas with water and the second bed comprises a packing material suitable to facilitate extraction of hydrocarbons and impurities from the syngas.

13. The process according to paragraph 11 or 12, wherein at least a portion of the water withdrawn at the first water outlet is recycled and returned to the apparatus via the first water inlet.

14. The process according to any one of paragraphs 11 to 13, wherein at least a portion of the water withdrawn at the first water outlet is returned to the apparatus via the second water inlet.

15. The process according to any one of paragraphs 11 to 14, wherein the water introduced to the apparatus via the first water inlet comprises recycled water withdrawn from the first water outlet and make-up water.

16. The process according to any one of paragraphs 11 to 15, wherein the apparatus further has a top section and a bottom section, wherein the first packed bed is located in the top section and the second packed bed is located in the bottom section, and wherein the top and bottom sections are separated by a full or partial physical divider.

17. The apparatus according to paragraph 16, wherein the physical divider is a chimney pan.

18. The process according to any one of paragraphs 11 to 17, wherein the byproducts extracted from the syngas are selected from the group consisting of particulate materials, $C_2$-$C_{20}$ hydrocarbons, halides, sulfur containing compounds, ammonia containing compounds, and combinations thereof.

19. The process according to any one of paragraphs 11 to 18, wherein water exiting the apparatus via the second water outlet is first held within the apparatus for an amount of time sufficient to allow light hydrocarbons entrained in the water to separate and rise to the surface of the held water.

20. The process according paragraph 19, wherein the separated light hydrocarbons are withdrawn from the apparatus via a light hydrocarbon outlet located near the second end of the apparatus.

21. The process according to any one of paragraphs 11 to 20, wherein the apparatus is generally vertical in orientation, such that the first end is at the top of the apparatus and the second end is at the bottom of the apparatus.

22. The process according to any one of paragraphs 11 to 21, wherein the syngas introduced to the apparatus via the syngas inlet comprises from about 1 wt % to about 10 wt % methane, from about 10 wt % to about 30 wt % carbon monoxide, from about 10 wt % to about 30 wt % carbon dioxide, from about 0 wt % to about 2 wt % hydrogen, from about 3 wt % to about 10 wt % water, from about 40 wt % to about 70 wt % nitrogen, and less than about 1 wt % of each of one or more halides, sulfur containing compounds, and ammonia.

23. The process according to any one of paragraphs 11 to 22, wherein a temperature of the syngas at the syngas outlet is greater than a temperature of the syngas at the syngas inlet.

24. The process according to any one of paragraphs 11 to 23, wherein the first bed comprises a random packing material and the second bed comprises a structured packing material.

25. A process for the production and treatment of syngas comprising: gasifying coal to produce syngas; filtering the syngas to at least partially remove ash, other particulate materials, or combinations thereof; cooling the syngas; at least partially saturating and purifying the syngas according to any one of paragraphs 11 to 24; and optionally supplying the at least partially saturated and purified syngas to a water gas shift reactor.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error, operating flexibility, and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

The foregoing description of the invention is illustrative and explanatory of the present invention. Various changes in the materials, apparatus, and process employed will occur to those skilled in the art. It is intended that all such variations within the scope and spirit of the appended claims be embraced thereby.

What is claimed is:

1. A process for at least partially saturating and purifying syngas, comprising:
introducing a first essentially water via a first water inlet to a first end of an apparatus having the first end and a second end;
introducing a second essentially water via a second water inlet to the apparatus between the first end and the second end of the apparatus;
introducing a syngas via a syngas inlet to the second end of the apparatus such that the first essentially water and the second essentially water flow generally countercurrently through the apparatus with respect to the syngas, wherein a first packed bed and a second packed bed are disposed within the apparatus, wherein the first packed bed is located closer to the first end of the apparatus than the second packed bed, and wherein the second water inlet is located between the first packed bed and the second packed bed;
flowing the first essentially water and an at least partially purified syngas through the first packed bed under conditions sufficient to at least partially saturate the at least partially purified syngas;
withdrawing a first water from the apparatus via a first water outlet located between the first packed bed and the second packed bed;
flowing the second essentially water and the syngas through the second packed bed under conditions sufficient to at least partially remove byproducts from the syngas to provide the at least partially purified syngas, wherein the byproducts extracted from the syngas are selected from the group consisting of particulate materials, $C_2$-$C_{20}$ hydrocarbons, halides, ammonia containing compounds, and combinations thereof;
withdrawing a second water from the apparatus via a second water outlet at the second end of the apparatus, wherein the second water exiting the apparatus via the second water outlet is first held within the apparatus for an amount of time sufficient to allow light hydrocarbons entrained in the second water to separate and rise to the surface of the held second water; and
withdrawing an at least partially purified and an at least partially saturated syngas product from the apparatus via a syngas outlet at the first end of the apparatus.

2. The process of claim 1, wherein the first packed bed comprises a randomly packed material and the second packed bed comprises structured packing material, and wherein the randomly packed material comprises Raschig rings, Pall Rings, splined rings, saddles, or any mixture thereof.

3. The process of claim 1, wherein at least a portion of the first water withdrawn at the first water outlet is recycled and returned to the apparatus via the first water inlet.

4. The process of claim 1, wherein at least a portion of the first water withdrawn at the first water outlet is returned to the apparatus as at least a portion of the second essentially water via the second water inlet.

5. The process of claim 1, wherein the first essentially water introduced to the apparatus via the first water inlet comprises recycled first water withdrawn from the first water outlet and make-up water.

6. The process of claim 1, wherein the apparatus further has a top section and a bottom section, wherein the first packed bed is located in the top section and the second packed bed is located in the bottom section, and wherein the top and bottom sections are separated by a full or partial physical divider.

7. The process of claim 6, wherein the physical divider is a chimney pan.

8. The process of claim 1, wherein the byproducts extracted from the syngas are selected from the group consisting of particulate materials, ammonia containing compounds, and combinations thereof.

9. The process of claim 1, wherein the separated light hydrocarbons are withdrawn from the apparatus via a light hydrocarbon outlet located near the second end of the apparatus.

10. The process of claim 1, wherein the apparatus is generally vertical in orientation, such that the first end is at the top of the apparatus and the second end is at the bottom of the apparatus.

11. The process of claim 1, wherein the syngas introduced to the apparatus via the syngas inlet comprises from about 1 wt % to about 10 wt % methane, from about 10 wt % to about 30 wt % carbon monoxide, from about 10 wt % to about 30 wt % carbon dioxide, from about 0 wt % to about 2 wt % hydrogen, from about 3 wt % to about 10 wt % water, from about 40 wt % to about 70 wt % nitrogen, and less than about 1 wt % of each of one or more halides, sulfur containing compounds, and ammonia.

12. The process of claim 1, wherein a temperature of the syngas at the syngas outlet is greater than a temperature of the syngas at the syngas inlet.

13. The process of claim 1, wherein the byproducts extracted from the syngas comprise ammonia containing compounds.

14. A process for the production and treatment of syngas comprising:
- gasifying coal to produce syngas
- filtering the syngas to at least partially remove ash, other particulate materials, or combinations thereof;
- cooling the syngas;
- at least partially saturating and purifying the syngas according to claim 1; and
- supplying the at least partially saturated and purified syngas to a water gas shift reactor.

* * * * *